(12) United States Patent
Willey et al.

(10) Patent No.: US 7,901,084 B2
(45) Date of Patent: Mar. 8, 2011

(54) IMAGE PROJECTOR WITH DISPLAY MODES

(75) Inventors: Stephen R. Willey, Bellevue, WA (US); Randall B. Sprague, Carnation, WA (US); Thomas W. Montague, Mercer Island, WA (US); Christopher A. Wiklof, Everett, WA (US); Maarten Niesten, Kirkland, WA (US); Mark Freeman, Snohomish, WA (US); Bruce Rothaar, Woodinville, WA (US); V. G. Veeraraghavan, Redmond, WA (US); John R. Lewis, Bellevue, WA (US)

(73) Assignee: Microvision, Inc., Redmond, WA (US)

( * ) Notice: Subject to any disclaimer, the term of this patent is extended or adjusted under 35 U.S.C. 154(b) by 996 days.

(21) Appl. No.: 11/592,757

(22) Filed: Nov. 2, 2006

(65) Prior Publication Data

US 2007/0195294 A1 Aug. 23, 2007

Related U.S. Application Data

(60) Provisional application No. 60/733,318, filed on Nov. 2, 2005.

(51) Int. Cl.
*G03B 21/14* (2006.01)
*G03B 21/26* (2006.01)
*G03B 21/00* (2006.01)

(52) U.S. Cl. .............................. 353/49; 353/82; 353/122

(58) Field of Classification Search .................... 353/69, 353/70, 46, 48, 50, 101, 82, 122, 49, 34
See application file for complete search history.

(56) References Cited

U.S. PATENT DOCUMENTS

| 5,428,415 | A | 6/1995 | Keelan et al. | |
|---|---|---|---|---|
| 6,431,711 | B1 | 8/2002 | Pinhanez | |
| 6,830,340 | B2 * | 12/2004 | Olson et al. | 353/30 |
| 6,854,850 | B2 | 2/2005 | Yaniv | |
| 6,888,582 | B2 * | 5/2005 | Tominaga et al. | 349/5 |
| 2003/0223048 | A1 * | 12/2003 | Kimura | 353/70 |
| 2004/0046943 | A1 * | 3/2004 | Muramatsu | 353/70 |
| 2006/0087624 | A1 * | 4/2006 | Przybyla et al. | 353/84 |

* cited by examiner

*Primary Examiner* — William C Dowling
*Assistant Examiner* — Ryan Howard
(74) *Attorney, Agent, or Firm* — Kevin D. Wills

(57) ABSTRACT

A portable video projector includes facility to direct a projected image field along an axis in an alignment corresponding to the state of an optical element.

43 Claims, 5 Drawing Sheets

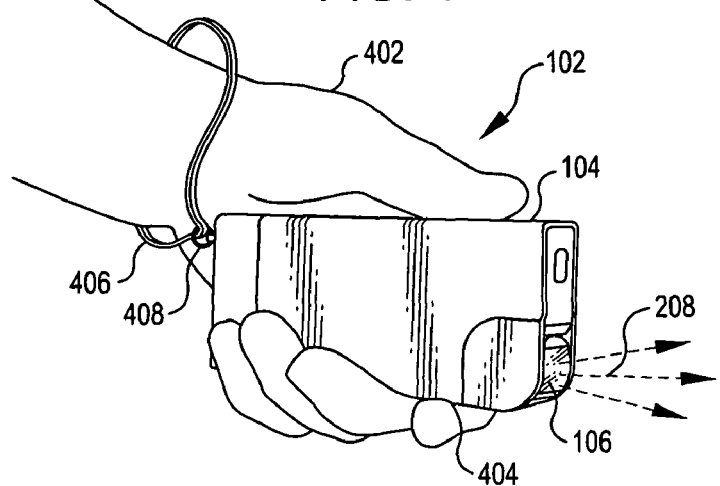
FIG. 4
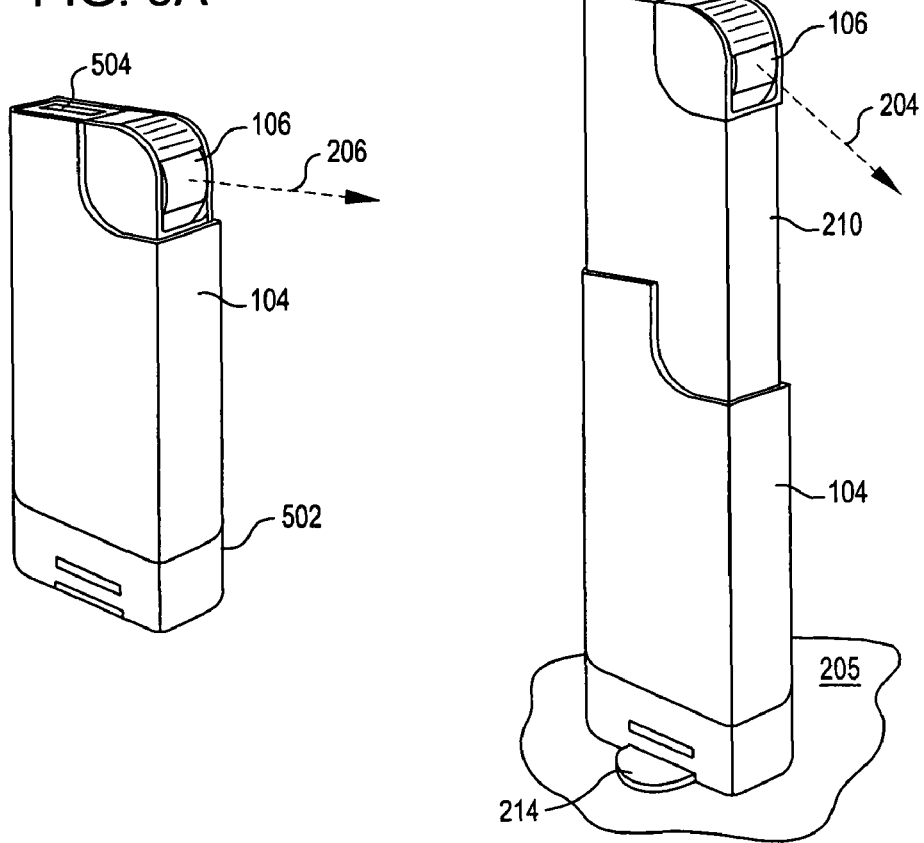
FIG. 5A
FIG. 5B

IMAGE PROJECTOR WITH DISPLAY MODES

This application claims priority benefit from the U.S. Provisional Patent Application Ser. No. 60/733,318, entitled IMAGE PROJECTOR WITH DISPLAY MODES, filed Nov. 2, 2005, commonly assigned herewith and hereby incorporated by reference.

TECHNICAL FIELD

This application relates to projection displays, and especially to portable projection displays with plural display orientations.

OVERVIEW

In a portable projection display, it may be useful to have a selectable a display surface. According to an embodiment, a portable projection display includes a movable optical element to direct the image field and provide user input for control functions.

According to other aspects, various features are provided that make a portable projection display more convenient, easier to use, more adaptable, smaller, lighter, less expensive, more stable, provide better image quality, and other favorable attributes.

BRIEF DESCRIPTION OF THE DRAWINGS

FIG. 4 is a perspective view of a portable projection display held in the hand of a user according to an embodiment.

FIG. 5A is a perspective view of the portable projection display of the previous figures showing features in a second configuration according to an embodiment.

FIG. 5B is a perspective view of the portable projection display of the previous figures showing features in a third configuration according to an embodiment.

DETAILED DESCRIPTION

Figure 1:
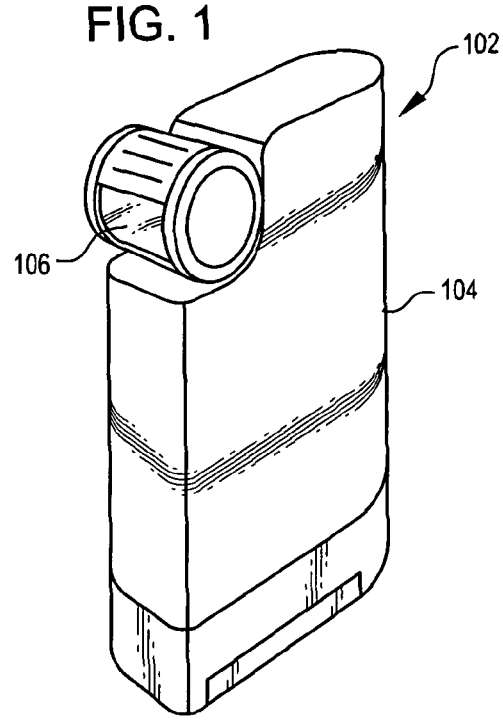
FIG. 1 is a perspective view of a portable scanned beam projection display according to an embodiment.

The perspective view of FIG. 1 illustrates a portable scanned beam projection display 102 that includes a body 104 having an output optical element 106 mounted thereon according to an embodiment.

Figure 2:
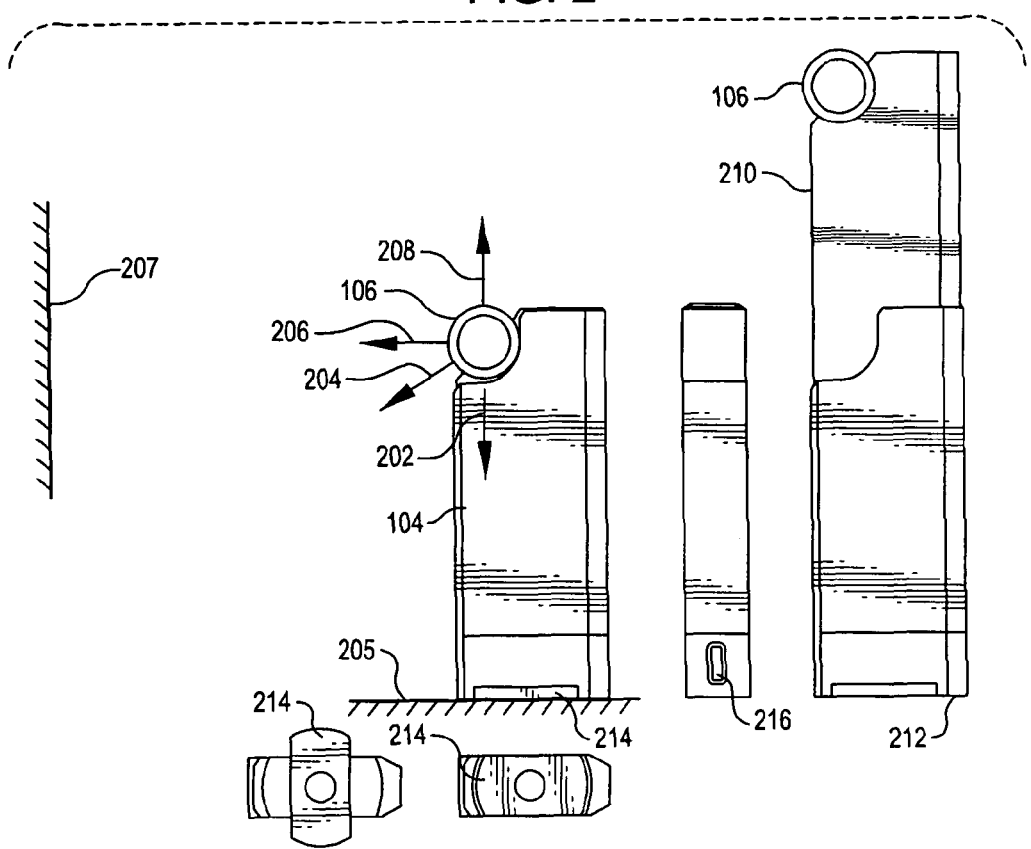
FIG. 2 includes top, bottom, and elevation views of a portable projection display according to an embodiment.
Figure 3A:
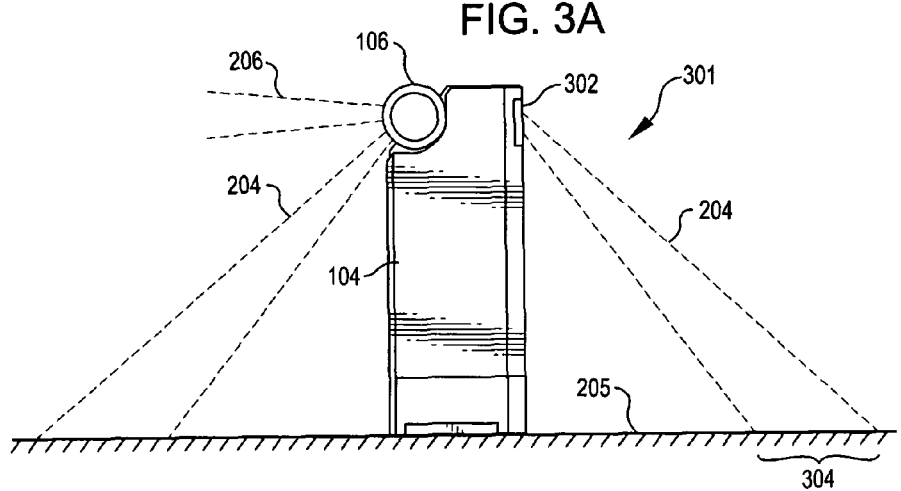
FIG. 3A is a view of a portable projection display showing a variety of display modes according to an embodiment.

As shown in FIGS. 2 and 3A, the output element 106 may be rotated to a first position 202. In position 202, the optical element may be shielded by the body 104 of the device and the device may be switched to "off", "hibernate, or other states. The position of the optical element 106 may be sensed, for instance using an optical encoder, a rotary switch, or the like to automatically switch modes.

In position 204 (or positions 204), the optical element 106 is rotated to project an image generally forward at one or more angles appropriate for intersecting a table surface 205. The projected image may optionally be automatically rotated, for example such that "top" is positioned toward the base 212 of the body 104 for convenient viewing by a user facing the front of the body.

In position 206, the optical element 106 is rotated to a position generally forward and parallel with the table surface to project an image on a wall 207. According to an embodiment, the position may be adjusted upward or downward from parallel with the table surface, for example, to select an image height on the wall. The projected image may optionally be automatically rotated to project an image whose "top" is oriented in an upward direction on the wall.

In position 208, the optical element 106 may be rotated to a position generally parallel with the vertical axis of the body 104. In this mode, for example, the image projector may be conveniently held in the hand of a user and pointed toward a vertical or horizontal surface, such as while giving an ad hoc presentation.

The body 104 may include a telescoping portion 210 that may be operative to raise the optical element 106 to a greater distance from the base 212 of the body 104. This position may be especially appropriate for raising the optical element above a table surface to project at a less oblique angle toward the table in table projection mode 204, or for raising the height of the optical element 106 above the base when projecting in wall projection mode 206, such as to avoid shadowing by papers, computers, or other objects on the table. According to an embodiment, extension of the telescoping portion 210 from the body 104 may be operative to expose the optical element 106, provide access to a protected wireless interface, provide access to control surfaces, reveal an auxiliary (e.g. flat screen) micro display, expose a heat exchanger, etc. (not shown).

The body may include a deployable base, here shown as a rotating member 214, that can stabilize the projector body 104 relative to a table surface 205. According to embodiments, the body may include a magnet, hook, eye, lapel pin, soft grip, lanyard fasteners, fastener holes, tripod mount, etc. (not shown).

According to an embodiment 301 shown in FIG. 3, the portable image projector includes an image projection aperture 302 operable to form a directed image beam 204 onto a table 205 to create a displayed image 304. For some embodiments, the table projection port 302 may project the same image as optical element 106, for example to project opposing images 204 suitable for simultaneous viewing by persons seated across a table from one another. According to an embodiment, the optical element may project more than one image such as simultaneously projecting along projection fields at 204 and 206. In such an embodiment, it may be preferable to omit a separate table projection port 302.

According to another embodiment, the second image may include a different image than that projected by the optical element 106. For example, the image 304 may comprise a preview of the next slide, a timer, slide notes, scrolling text, or other indicia that may be useful to a person leading a presentation.

According to another embodiment, the image projection aperture 302 or second projected field 204 may project and/or detect a control field. For example image 304 may comprise a projected keyboard image and table projection port 302 (or second projected field 204 from the optical element 106) may include a virtual keystroke detector. Alternatively or additionally, image 304 may comprise an image similar or identical to the image projected by the optical element 106, but add detection capabilities to enable mouse, pointer, partial obscuration, etc. as may be desired by the user, such as for controlling the image 206 projected by the optical element 106.

Figure 3B:
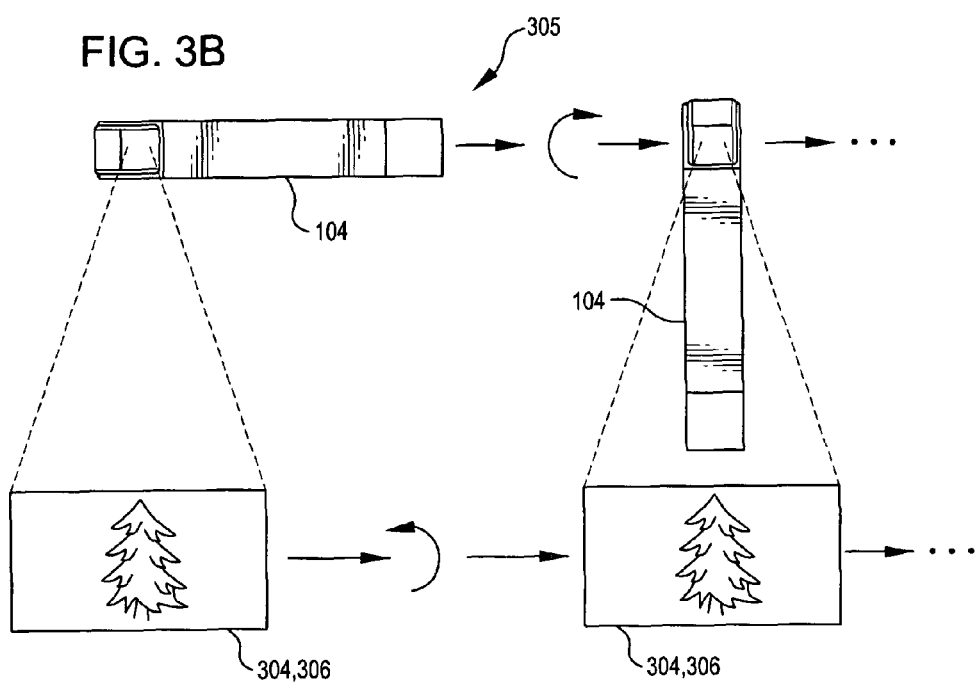
FIG. 3B is a view of a portable projection display showing a variety of display modes according to an embodiment.

FIG. 3B illustrates an embodiment 305 having a variety of display modes wherein the projected image may be rotated, such as to compensate for a change in orientation of the projector body 104. On the left side of FIG. 3B, the body 104 of the microprojector is shown aligned with its long axis horizontal and the long axis of a table-projected image 304 or primary projected image 306 aligned parallel with the long axis of the body 104. The right side of FIG. 3B shows the body of 104 of the microprojector rotated (clockwise from the reader's perspective) to align the long axis of the body 104 vertically. The projected image 304, 306 may be rotated (counterclockwise from the reader's perspective) to maintain the illustrated landscape-oriented display with its long axis horizontal. Of course, a portrait-oriented image may be similarly rotated to maintain or provide a desired orientation. A variety of approaches may be used to actuate rotation of the projected image 304, 306; including, for example, rotation of the image bitmap by the controller (not shown in FIG. 3B), issuing a request to a remote host to rotate the image bitmap, rotation of the scan axes of a scanned beam-based projection engine (not shown in FIG. 3B), optical rotation of the projected field by an image rotation optical element (not shown), etc. According to an embodiment, the projected image rotation may be automatically selected according to the body 104 orientation. According to an embodiment, the orientation of the body 104 may be automatically detected. According to an embodiment, the projected image rotation may be automatically selected based on image content, a mode of use, user preference, etc. According to an embodiment, the projected image rotation may be manually selected, such as from a control included on the body 104, a mouse click or keyboard command received at a host computer, a software command received from a host computer, a voice command received by a microphone or via a digital interface, etc.

FIG. 4 is a perspective view of a portable projection display 102 held in the hand of a user 402 according to a configuration of an embodiment. The body 104 may include a hand grip or comfort feature 404 adopted to improve the feel of the body 104 to the user's hand 402. A lanyard 406 may be coupled to the body 104 at a lanyard mount 408. The output optical element 106 is shown configured to project an image 208 aligned longitudinally with the body 104 as desired by the user.

FIG. 5A is a perspective view of the portable projection display of the foregoing figures showing some features in a second configuration according to an embodiment. The output optical element 106 is aligned to project a beam 206 approximately horizontally for display on a vertical surface. Body 104 includes a detachable battery pack 502. As illustrated, the battery pack 502 may be made compact for high portability. Alternatively, higher capacity battery packs (not shown) may be offered to increase projection time, projection brightness, projection range, etc. According to another embodiment, the portable projector display, optionally with the battery pack 502 still attached, may be docked into a DC power source (not shown) for increased capacity. The DC power source may optionally comprise a power converter for receiving AC power from a socket and converting it to DC power for consumption by the portable display.

Also visible in the view of FIG. 5A is an interface connect button 504. The interface connect button 504, here illustrated as a wireless button (for example a Bluetooth® connect button), may be used to initiate connection with a video source. For example, the interface connect button may be used in a manner similar to that described in U.S. patent application Ser. No. 10/794,159 entitled Electronic Device with Auxiliary Interfaces, filed Mar. 3, 2004 by Wiklof et al. and/or U.S. patent application Ser. No. 10/795,199 entitled Wireless Interface with Enhanced Functionality, also filed Mar. 3, 2004 by Wiklof et al., both incorporated by reference herein.

FIG. 5B is a perspective view of the portable projection display of the foregoing figures showing some features in a second configuration according to an embodiment. The extendable body portion 210 is shown extended from outer body 104 and the deployable foot 214 is shown rotated for added stability. The output optical element 106 is shown rotated to project an image along the axis 204 onto a surface 205. Alternatively, the output optical element 106 may remain physically stationary and an alternative projection axis selected by another mechanism. For example, an alternative light beam source or internal light beam path may be selected.

Figure 5C:
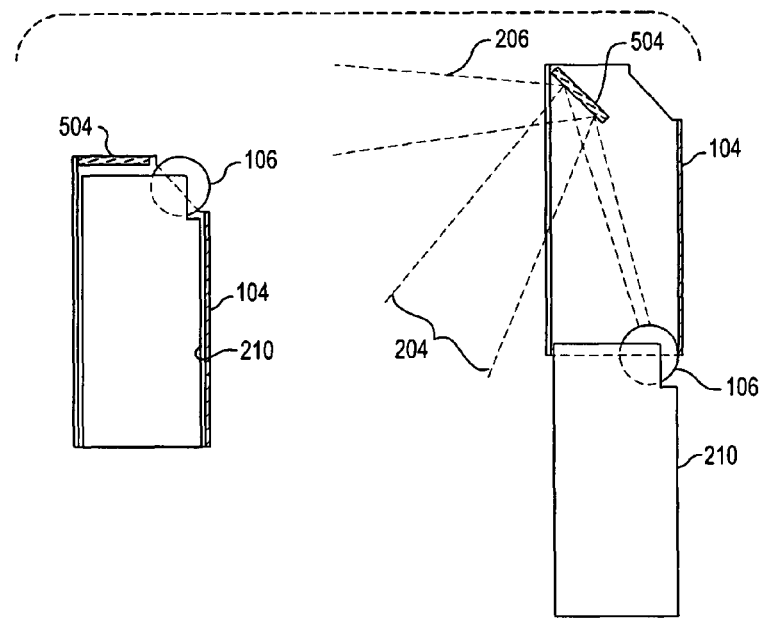
FIG. 5C is a side sectional view of a portable projection display having an extendable optical path according to an embodiment.

FIG. 5C includes two side sectional views of a portable projection display having an extendable optical path according to an embodiment. An extendable body portion 210 is shown in two positions relative to the outer body 104. The configuration on the left side of FIG. 5C shows the extendable body portion 210 in a retracted position substantially subtended by the outer body 104. An optical element 504 is shown in a folded configuration.

On the right side of FIG. 5C, the portable projection display is shown with the extendible body portion 120 in an extended position deployed substantially outside the outer body 104. The optical element 106 may be configured to project an image field toward the optical element 504 shown in a deployed configuration. As illustrated the optical elements 106 and 504 may cooperate to project image field along one or more axes 204, 206. The optical elements 204 and/or 504 may be constructed according to a variety of individual and compound optical element types such as a mirror, prism, total-internal-reflectance (TIR) relay, fiber optics, light pipe, lens, exit pupil expander, diffractive element, micro lens array, photonic crystal, etc. The optical element 504 may possess optical power as illustrated by the curved reflective surface of the illustrated embodiment. According to an embodiment, the optical power of the optical element 504 may be varied to suit an image projection environment. The optical power of the optical element 504 may be selected manually or automatically, according to a variety of methods.

Figure 5D:
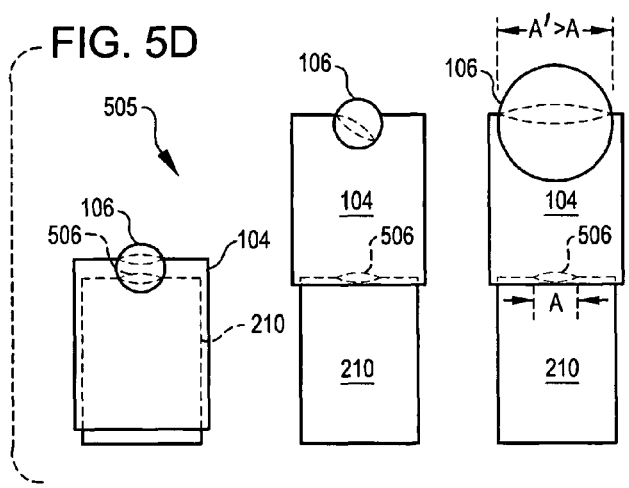
FIG. 5D is a side sectional view of the portable projection display of the foregoing figures according to an embodiment.

FIG. 5D includes three side sectional views of a portable projection display having an extendable optical path according to embodiments 505. A telescoping body portion 210 is shown in two positions relative to the outer body 104. The configuration on the left side of FIG. 5D shows the telescoping body portion 210 in a retracted position substantially subtended by the outer body 104. An optical element 106 is coupled to an outer portion of the body 104 and a second optical element 506 is coupled to the telescoping body portion. The middle portion of FIG. 5D shows one embodiment in an extended position wherein the fixed optical element 506 coupled to the telescoping body portion 210 is aligned to relay a video image to the optical element 106 and the optical element 106 is configured to select a projection axis exterior to the projection display body 104.

The rightmost portion of FIG. 5D shows an embodiment in an extended position wherein the fixed optical element 506 is configured to relay an expanding video image to the optical element 106. The optical element 106 may be configured to select a projection axis for a projected video field. The optical element 106 is configured to have an area A' greater than the area A of the optical element 506. In this configura the optical energy per unit area is decreased. Decreasing the optical energy per unit area may allow the portable video projector to attain a lower level safety rating, such as a CDRH Class 1, CDRH Class 2, or other safety rating that is less restrictive in its use than an embodiment with a smaller exit aperture area.

The optical element pairs 106, 506 may, for example, constitute a Fourier pair or other optical element pair configuration that provide enhanced depth-of-field, image fidelity, or other attributes associated with a longer focal distance between the illustrated retracted and telescoped configurations.

As illustrated by the foregoing figures, a variety of image display modes are contemplated. According to embodiments, the display modes may be provided singly or in combinations. According to an embodiment, the image display may be reversed to provide flexibility for selecting between rear-projection and front projection and/or between projected image and direct view. According to an embodiment, the image brightness may be varied according to environmental considerations such as whether a projected image is projected in a dark or bright environment, whether or not an external power source is provided, whether or not the image is directly viewed, etc. According to various embodiments, the portable image projector may be combined with other functionality such as a digital camera, cellular telephone, integrated video player, digital audio player, television receiver, image-augmented transit/monocular/binocular, etc.

Figure 6A:
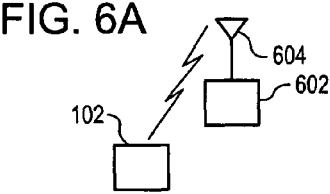
FIG. 6A is a block diagram of a projection display coupled to a remote device through an interface.

FIG. 6A is a block diagram of a projection display 102 coupled to a remote device 602 through an interface. The remote device 602 includes a compatible interface 604, here shown as an antenna. The portable image projector 102 may include an interface such as a USB port 216, Bluetooth®, WiFi, IEEE 1394 (Firewire), SD socket, IRdA port, or other interface to receive images for projection. According to an embodiment, the portable projector includes an operating system capable of retrieving images or video from a passive storage device such as a USB drive, SD card or other memory, and projecting images or video individually or in a slide show. This may be useful, for example, for accepting a memory device from a digital camera and projecting recently captured images to friends and family.

Figure 6B:
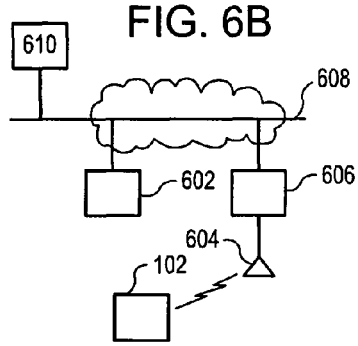
FIG. 6B is a block diagram of a projection display coupled to a remote device across a network.

FIG. 6B is a block diagram of a projection display 102 coupled to a remote device 602 across a network 608. A network gateway 606 includes an interface apparatus 604 for interfacing with the portable projection display 102. The network 608 may be of a number of different types including a cellular network, a satellite network, a cable TV network, a telephone service provider network, a dial-up network, a personal area network, a local area network, a metropolitan area network, the Internet, etc. The device 602 may provide video data to the portable projector 102. Alternatively, the device 602 may cause data stored on a network resource 610 such as a server to provide video data to the portable projector 102. The device 602 may be of a number of different configurations including a cellular telephone, a portable computer, a hand-held computer, etc. capable of interfacing with the network 608. Similarly, the interface between the portable projector 102 and the gateway device 606 may be of a number of different types such as those described above or others.

According to another embodiment, the gateway device 606 may be eliminated and the portable projector 102 interfaced directly to the network 608.

Figure 7:
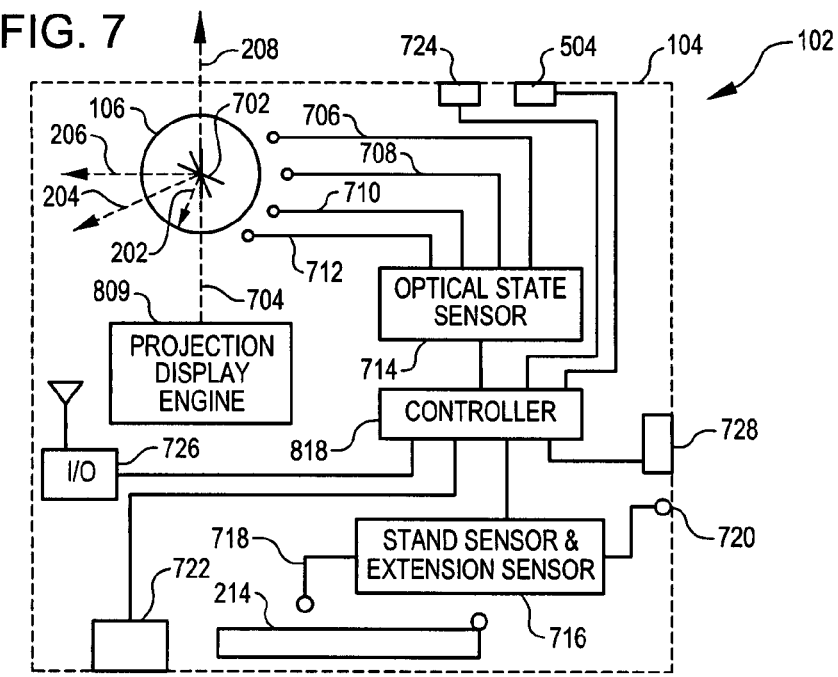
FIG. 7 is a block diagram of a projection display having an automatic mode detection.

FIG. 7 is a block diagram of a projection display having an automatic mode detection according to an embodiment. An output optical device 106 is configured to provide a number of output optical paths 202, 204, 206, and 208 as illustrated and as described above. According to one embodiment, the output optical element includes a mirror 702 aligned, at least in configurations corresponding to the output optical path 204 and 206 if present, to receive an image such as a scanned image from an axis 704 from a projection engine 809, which may for example include a scanned beam display engine or integrated photonics module. Various approaches may be used to construct the projection engine 809, including a scanned beam display engine, field-emission display, plasma display, micromirror array, image amplifier, organic LED, etc. U.S. provisional patent application Ser. No. 60/791,074, entitled INTEGRATED PHOTONICS MODULE AND DEVICES USING INTEGRATED PHOTONICS MODULES, filed Apr. 11, 2006, invented by Sprague et al., teaches an approach using a scanned beam engine and is incorporated by reference herein.

As illustrated, the output optical element is operable to automatically engage one or more of the position indication contacts 706, 708, 710, and 712 as the output optical element 106 is rotating to a corresponding alignment. The position indication contacts 706, 708, 710, and 712 are coupled to an optical state sensor 714 that is operable to determine the position of the optical element 106, and hence the optical output path 202, 204, 206, or 208 that the optical output element 106 is aligned to produce. The optical state sensor 714 is coupled to the controller 818 whereby the controller may control the projection engine 809 to output still or video images corresponding to the state of the output optical element 106. For example, when contact 706 is engaged, the optical element is rotated to a closed state and the controller may shut off the projection engine 809 or switch it to a stand-by mode.

When contact 708 is engaged, the optical element 106 is rotated to a horizontal surface display mode. The controller causes the projection engine 809 to display an image with default moderate brightness oriented in a default direction such that the top of the projected image is oriented toward the base of the projection display 102. According to alternative embodiments a body state sensor may include a stand sensor and/or extension sensor may be configured to automatically determine the state of the rotating foot 214 and/or the body extension 210 (not shown) through respective contacts 718 and 720. The stand sensor and extension sensor 716 is interfaced to the controller. The controller may then optionally use the extension and stand modes to automatically select display modes. For example, when the body is extended, the output optical element 106 may be estimated to be farther from the display surface. Accordingly, the controller 818 may cause the field of view of the projection engine 809 to be decreased to maintain a relatively constant image size or alternatively may compensate for a larger image size by increasing the power to the light source(s) in the projection engine 809. Alternatively, the portable projection display 104 may include a battery sensor 722 that determines a parameter corresponding to available projection power such as battery size, coupling to an external DC power dock (as described above) or other measurable parameter such as voltage sag. The controller 818 may then compensate for power effects by selecting a display mode most consistent with the available power. The portable projection may further include an ambient light sensor 724 to inform the controller 818 of the ambient light environment of the portable projector 102. Such information may be used to maintain readability in moderate ambient light environments by increasing illumination power, reduce eyestrain in low ambient light environments by reducing illuminator power, switch to a high brightness monochrome display mode (such as monochrome red, for example) to maintain readability in high brightness environments such as direct sunlight for example, or make other adjustments appropriate to compensate for the ambient light environment.

The projection display 102 may further include an interface connect button 504. The controller may use a signal from the interface connect button to initiate a communication session through an interface 726. To save battery power, the portable display may optionally shut down and reinitiate connection through the interface 724 according to the receipt of a "forward", "reverse", etc. command through a display command interface 728. For example, when a static or preprogrammed video image is being displayed, the interface 726 may be shut down. When a user depresses a "forward" command 728, the controller 818 may respond by reestablishing communication through interface 726, requesting a new image, receiving the new image, displaying the new image, and shutting down the interface 726 again until another command is received from the user display command interface 728. Alternatively, the portable projector 102 may cache some amount of display information to allow some commands received through user display interface 728 to be executed without requiring further connection through the interface 726.

Returning to the operation of the optical state sensor 714, when contact 710 is engaged, the optical element 106 is rotated to a vertical surface display mode. The controller 818 may then select a moderate display brightness and an upright or erect image display with the top of the display oriented in the up direction. When the optical state sensor detects that contact 712 is engaged, the output optical element is rotated to provide an axial, presumably hand-held projection mode. Such a mode may result in an upright image such that the top of the image is oriented to the right of FIG. 7, the output brightness is set to high to allow for the longest range, and/or optical stabilization is enabled. Similarly, a level detector (not shown) may be operable to detect the orientation of the body relative to vertical and may provide input to the controller 818 to select image rotation such as the approach illustrated by FIG. 3B, above.

Figure 8:
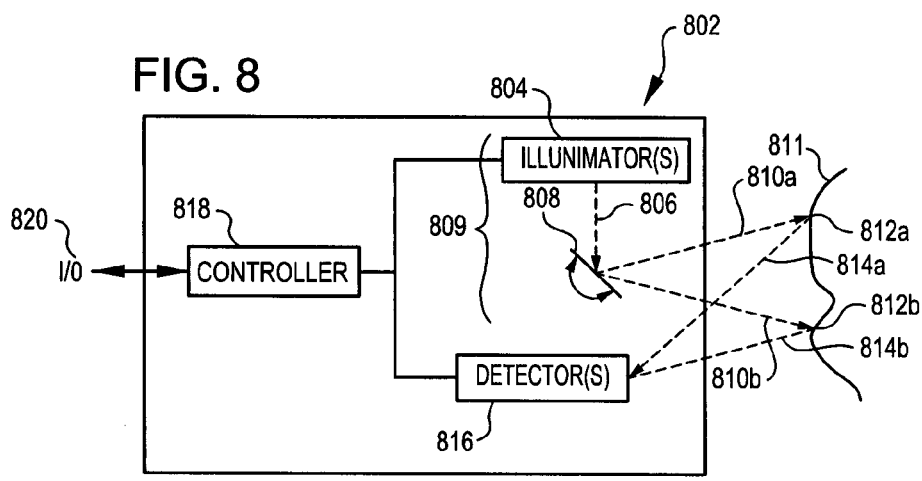
FIG. 8 is a block diagram of a scanned-beam type portable projection display according to an embodiment.

FIG. 8 is a block diagram of a scanned-beam type portable projection display according to an embodiment. FIG. 8 is a block diagram of an exemplary projection display apparatus 802 with a capability for displaying an image on a surface 811 according to an embodiment. An input video signal, received through interface 820 drives a controller 818. The controller 818, in turn, sequentially drives an illuminator 804 to a brightness corresponding to pixel values in the input video signal while the controller 818 simultaneously drives a scanner 808 to sequentially scan the emitted light. The illuminator 804 creates a first beam of light 806. The illuminator 804 may, for example, comprise red, green, and blue modulated lasers combined using a combiner optic and beam shaped with a beam shaping optical element. A scanner 808 deflects the first beam of light across a field-of-view (FOV) to produce a second scanned beam of light 810. Taken together, the illuminator 804 and scanner 808 comprise a scanned beam display engine 809. Instantaneous positions of scanned beam of light 810 may be designated as 810a, 810b, etc. The scanned beam of light 810 sequentially illuminates spots 812 in the FOV, the FOV comprising a display surface or projection screen 811. Spots 812a and 812b on the projection screen are illuminated by the scanned beam 810 at positions 810a and 810b, respectively. To display an image, substantially all the spots on the projection screen are sequentially illuminated, nominally with an amount of power proportional to the brightness of an input video image pixel corresponding to each spot.

While the beam 810 illuminates the spots, a portion of the illuminating light beam is reflected or scattered as scattered energy 814a and 814b according to the properties of the object or material at the locations of the spots. A portion of the scattered light energy 814a and 814b may travel to one or more detectors 816 that receive the light and produce electrical signals corresponding to the amount of light energy received. The detectors 816 transmit a signal proportional to the amount of received light energy to the controller 818.

According to alternative embodiments, the one or more detectors 816 and/or the controller 818 are selected to produce and/or process signals from a representative sampling of spots. Screen compensation values for intervening spots may be determined by interpolation between sampled spots. Neighboring sampled values having large differences may be indicative of an edge lying there between. The location of such edges may be determined by selecting pairs or larger groups of neighboring spots between which there are relatively large differences, and sampling other spots in between to find the location of edges representing features of interest. The locations of edges on the display screen may similarly be tracked using image processing techniques.

The light source 804 may include multiple emitters such as, for instance, light emitting diodes (LEDs), lasers, thermal sources, arc sources, fluorescent sources, gas discharge sources, or other types of illuminators. In a preferred embodiment, illuminator 804 comprises a red laser diode having a wavelength of approximately 635 to 670 nanometers (nm). In another preferred embodiment, illuminator 804 comprises three lasers; a red diode laser, a green diode-pumped solid state (DPSS) laser, and a blue DPSS laser at approximately 635 nm, 532 nm, and 473 nm, respectively. While some lasers may be directly modulated, other lasers, such as DPSS lasers for example, may require external modulation such as an acousto-optic modulator (AOM) for instance. In the case where an external modulator is used, it is considered part of light source 804. Light source 804 may include, in the case of multiple emitters, beam combining optics to combine some or all of the emitters into a single beam. Light source 804 may also include beam-shaping optics such as one or more collimating lenses and/or apertures. Additionally, while the wavelengths described in the previous embodiments have been in the optically visible range, other wavelengths may be within the scope.

Light beam 806, while illustrated as a single beam, may comprise a plurality of beams converging on a single scanner 808 or onto separate scanners 808.

Scanner 808 may be formed using many known technologies such as, for instance, a rotating mirrored polygon, a mirror on a voice-coil as is used in miniature bar code scanners such as used in the Symbol Technologies SE 900 scan engine, a mirror affixed to a high speed motor or a mirror on a bimorph beam as described in U.S. Pat. No. 4,387,297 entitled PORTABLE LASER SCANNING SYSTEM AND SCANNING METHODS, an in-line or "axial" gyrating, or "axial" scan element such as is described by U.S. Pat. No. 6,390,370 entitled LIGHT BEAM SCANNING PEN, SCAN MODULE FOR THE DEVICE AND METHOD OF UTILIZATION, a non-powered scanning assembly such as is described in U.S. patent application Ser No.10/007,784, SCANNER AND METHOD FOR SWEEPING A BEAM ACROSS A TARGET, commonly assigned herewith, a MEMS scanner, or other type. All of the patents and applications referenced in this paragraph are hereby incorporated by reference.

A MEMS scanner may be of a type described in U.S. Pat. No. 6,140,979, entitled SCANNED DISPLAY WITH PINCH, TIMING, AND DISTORTION CORRECTION; U.S. Pat. No. 6,245,590, entitled FREQUENCY TUNABLE RESONANT SCANNER AND METHOD OF MAKING; U.S. Pat. No. 6,285,489, entitled FREQUENCY TUNABLE RESONANT SCANNER WITH AUXILIARY ARMS; U.S. Pat. No. 6,331,909, entitled FREQUENCY TUNABLE RESONANT SCANNER; U.S. Pat. No. 6,362,912, entitled SCANNED IMAGING APPARATUS WITH SWITCHED FEEDS; U.S. Pat. No. 6,384,406, entitled ACTIVE TUNING OF A TORSIONAL RESONANT STRUCTURE; U.S. Pat. No. 6,433,907, entitled SCANNED DISPLAY WITH PLURALITY OF SCANNING ASSEMBLIES; U.S. Pat. No. 6,512,622, entitled ACTIVE TUNING OF A TORSIONAL RESONANT STRUCTURE; U.S. Pat. No. 6,515,278, entitled FREQUENCY TUNABLE RESONANT SCANNER AND METHOD OF MAKING; U.S. Pat. No. 6,515,781, entitled SCANNED IMAGING APPARATUS WITH SWITCHED FEEDS; U.S. Pat. No. 6,525,310, entitled FREQUENCY TUNABLE RESONANT SCANNER; and/or U.S. patent application Ser. No. 10/984327, entitled MEMS DEVICE HAVING SIMPLIFIED DRIVE; for example; all incorporated by reference herein.

In the case of a 1D scanner, the scanner is driven to scan output beam 810 along a single axis and a second scanner is driven to scan the output beam 810 in a second axis. In such a system, both scanners are referred to as scanner 808. In the case of a 2D scanner, scanner 808 is driven to scan output beam 810 along a plurality of axes so as to sequentially illuminate pixels 812 on the projection screen 811.

For compact and/or portable display systems 802, a MEMS scanner is often preferred, owing to the high frequency, durability, repeatability, and/or energy efficiency of such devices. A bulk micro-machined or surface micro-machined silicon MEMS scanner may be preferred for some applications depending upon the particular performance, environment or configuration. Other embodiments may be preferred for other applications.

A 2D MEMS scanner 808 scans one or more light beams at high speed in a pattern that covers an entire projection screen or a selected region of a projection screen within a frame period. A typical frame rate may be 60 Hz, for example. Often, it is advantageous to run one or both scan axes resonantly. In one embodiment, one axis is run resonantly at about 19 KHz while the other axis is run non-resonantly in a sawtooth pattern to create a progressive scan pattern. A progressively scanned bi-directional approach with a single beam, scanning horizontally at scan frequency of approximately 19 KHz and scanning vertically in sawtooth pattern at 60 Hz can approximate an SVGA resolution. In one such system, the horizontal scan motion is driven electrostatically and the vertical scan motion is driven magnetically. Alternatively, both the horizontal scan may be driven magnetically or capacitively. Electrostatic driving may include electrostatic plates, comb drives or similar approaches. In various embodiments, both axes may be driven sinusoidally or resonantly.

Several types of detectors 816 may be appropriate, depending upon the application or configuration. For example, in one embodiment, the detector may include a PIN photodiode connected to an amplifier and digitizer. In this configuration, beam position information is retrieved from the scanner or, alternatively, from optical mechanisms. In the case of multi-color imaging, the detector 816 may comprise splitting and filtering to separate the scattered light into its component parts prior to detection. As alternatives to PIN photodiodes, avalanche photodiodes (APDs) or photomultiplier tubes (PMTs) may be preferred for certain applications, particularly low light applications.

In various approaches, photodetectors such as PIN photodiodes, APDs, and PMTs may be arranged to stare at the entire projection screen, stare at a portion of the projection screen, collect light retro-collectively, or collect light confocally, depending upon the application. In some embodiments, the photodetector 816 collects light through filters to eliminate much of the ambient light.

The projection display 802 may be embodied as monochrome, as full-color, or hyper-spectral. In some embodiments, it may also be desirable to add color channels between the conventional RGB channels used for many color displays. Herein, the term grayscale and related discussion shall be understood to refer to each of these embodiments as well as other methods or applications within the scope of the invention. In the control apparatus and methods described below, pixel gray levels may comprise a single value in the case of a monochrome system, or may comprise an RGB triad or greater in the case of color or hyperspectral systems. Control may be applied individually to the output power of particular channels (for instance red, green, and blue channels) or may be applied universally to all channels, for instance as luminance modulation.

In addition to detection of light scattered by the display surface 811, the detector(s) 816 may be used to detect ambient light to inform the controller 818 of the appropriate display mode, as described above.

Figure 9:
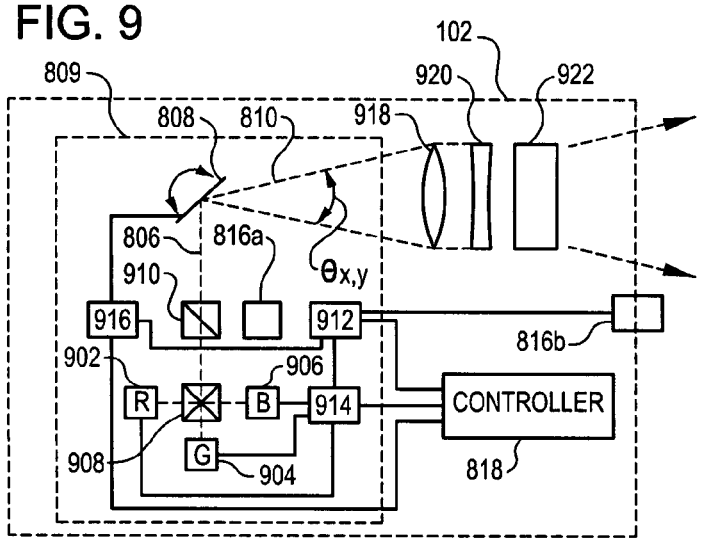
FIG. 9 is a block diagram of a portable projection display having a safety sight source shutoff and other safety features.

FIG. 9 is a block diagram of a portable projection display having a safety sight source shutoff and other safety features. The scanned beam display engine includes an automatic safety shutoff to ensure eye safety. Beams from red, green, and blue light emitters 902, 904, and 906 are combined in a beam combiner 908 to produce an output beam of light 806 that is modulated according to pixel values. The beam scanner 808 receives the beam 806 and produces a scanned beam 810 that scans through angles theta-x and theta-y in the x- and y-axes, respectively. A beam splitter 910 receives light energy backscattered off scan mirror 808 and splits a portion of it to a light detector 816a. Light detector 816a, and optionally a second light detector 816b, are interfaced to a safety controller 912. The safety controller 912, which may be configured as a part of main controller 818, monitors the back scattered light looking for situations corresponding to potential eye danger of a user, optionally by comparing the returned signal to the ambient light intensity determined by light detector 816b. For example, a high amount of returned light may correspond to the output of the device being too close to a human eye for safety and the safety controller may cause a shutdown of the light sources 902, 904, and 906 through light source shut-of switch 914. Similarly, the scan mirror 808 may be monitored by mirror safety circuit 916. Stopping of the mirror may similarly be used to shut down the light sources.

A second safety feature expands the exit pupil to reduce maximum optical intensity. Telecentric lens 918 is aligned to receive scanned beam 810 and project it onto an optical element 920, which may be embodied as a microlens array. The microlens array spreads the energy across an output optical element 922 to reduce peak intensity.

The preceding overview of the invention, brief description of the drawings, and detailed description describe exemplary embodiments according to the present invention in a manner intended to foster ease of understanding by the reader. Other structures, methods, and equivalents may be within the scope of the invention. The scope of the invention described herein shall be limited only by the claims.

What is claimed is:

1. A handheld portable projector system comprising:
a body;
a projection display engine operable to generate a first image and a second image, wherein the projection display engine is contained substantially within the body, and wherein the first image and the second image are generated from an electronic signal selected from at least one of an image for display and a video data stream;
an optical element aligned to receive the first image from the projection display engine and operable to project the first image along one of a plurality of projection paths on a surface remote from the handheld portable projector; and
an image projection aperture adapted to project the second image simultaneously with the first image, wherein the second image is projected along an axis different than any of the plurality of projection paths, and wherein the axis of the second image is neither parallel nor perpendicular to the plurality of projection paths.

2. The portable projector system of claim 1 wherein the optical element is operable to project the first image from the projection display engine along one of a plurality of projection paths.

3. The portable projector system of claim 1 further comprising:
a second optical element; and
a telescoping portion operable to vary an optical path length between the optical element and the second optical element.

4. The portable projector system of claim 3 wherein the optical element is coupled to the body.

5. The portable projector system of claim 3 wherein the optical element is coupled to the telescoping portion.

6. The portable projector system of claim 3 wherein at least one of the optical element and the second optical element is selected from the group consisting of a mirror, a prism, a total-internal-reflectance (TIR) relay, an optical fiber, a light pipe, a lens, an exit pupil expander, a diffractive element, a micro lens array, and a photonic crystal.

7. The portable projector system of claim 1 further comprising, coupled to the body, at least one selected from the group consisting of a magnet, a hook, an eye, a lapel pin, a hand grip, a lanyard, a fastener, a fastener hole, and a tripod mount.

8. The portable projector system of claim 1, wherein the image projection aperture is coupled to the body.

9. The portable projector system of claim 1, wherein the image projection aperture is coupled to the optical element.

10. The portable projector system of claim 1 wherein a difference between the plurality of projection paths includes image rotation.

11. The portable projector system of claim 1 wherein a difference between the plurality of projection paths includes image rotation and further comprising:
a detector operable to automatically detect a preferred image rotation.

12. The portable projector system of claim 1 further comprising:
a second optical element; and
a telescoping portion operable to vary an optical path length between the optical element and the second optical element; and wherein
the variable optical path length is adapted to reduce the optical energy density in an external optical path.

13. The portable projector system of claim 1 further comprising:
one or more wireless interfaces operable to do at least one selected from the list consisting of receiving the image for display, receiving the video data stream, receiving an operational command, transmitting an image, transmitting a video data stream, and transmitting an operational command.

14. The portable projector system of claim 1 further comprising:
an optical element state sensor configured to determine the state of the optical element.

15. The portable projector system of claim 1 further comprising:
a body configuration sensor adapted to determining at least one selected from the group consisting of an amount of telescoping portion extension, an internal optical path length, a mounting apparatus state, and a body orientation.

16. The portable projector system of claim 1 further comprising a user interface.

17. The portable projector system of claim 1 further comprising a user interface including at least one selected from the group consisting of a power condition selector, a display mode selector, a slide advance selector, a power switch, a momentary projection switch, and a standby switch.

18. The portable projection system of claim 1 further comprising an ambient environment sensor.

19. The portable projection system of claim 1 further comprising:
a controller operable to drive the projection display engine; and
an ambient environment sensor coupled to the controller and operable to convey information about the ambient environment to the controller; and wherein the controller is operable to select at least one display parameter responsive to the information about the ambient environment.

20. The handheld portable projector system of claim 1, wherein the first image is the same as the second image.

21. The handheld portable projector system of claim 1, wherein the first image is different than the second image.

22. The handheld portable projector system of claim 1, wherein the second image includes a control field, wherein the handheld portable projector system is adapted to optically receive input from the control field.

23. The handheld portable projector system of claim 22, wherein the input received by the handheld portable projector is the selection of an image attribute.

24. The handheld portable projector system of claim 22, wherein the input received by the handheld portable projector via the second image modifies the first image.

25. In a handheld portable projector, a method of projecting at least one image, comprising:
providing a body;
a projection display engine contained substantially within the body, generating a first image and a second image from an electronic signal selected from at least one of an image for display and a video data stream;
an optical element projecting the first image along one of a plurality of projection paths on a surface remote from the handheld portable projector; and an image projection aperture simultaneously projecting a second image along an axis different from any of the plurality of projection paths, wherein the axis of the second image is neither parallel nor perpendicular to the plurality of projection paths.

26. The method for projecting at least one image of claim 25, wherein projecting the first image comprises projecting the first image along an axis in an alignment corresponding to the state of the optical element.

27. The method for projecting at least one image of claim 25, wherein projecting the first image comprises the optical element projecting the first image from the projection display engine along the one of a plurality of projection paths.

28. The method for projecting at least one image of claim 25, further comprising:
providing a second optical element; and
a telescoping portion varying the optical path length between the optical element and the second optical element.

29. The method for projecting at least one image of claim 28, wherein at least one of the optical element and the second optical element is selected from the group consisting of a mirror, a prism, a total-internal-reflectance (TIR) relay, an optical fiber, a light pipe, a lens, an exit pupil expander, a diffractive element, a micro lens array, and a photonic crystal.

30. The method for projecting at least one image of claim 25, wherein the image projection aperture is coupled to the body.

31. The method for projecting at least one image of claim 25, wherein the image projection aperture is coupled to the optical element.

32. The method for projecting at least one image of claim 25, wherein a difference between the plurality of projection paths includes image rotation.

33. The method for projecting at least one image of claim 25, wherein a difference between the plurality of projection paths includes image rotation and further comprising:
automatically detecting a preferred image rotation.

34. The method for projecting at least one image of claim 25, further comprising:
providing a second optical element; and
a telescoping portion varying an optical path length between the optical element and the second optical element; and wherein
the variable optical path length reducing the optical energy density in an external optical path.

35. The method for projecting at least one image of claim 25, further comprising:
one or more wireless interfaces operable to do at least one selected from the list consisting of receiving the image for display, receiving the video data stream, receiving an operational command, transmitting an image, transmitting a video data stream, and transmitting an operational command.

36. The method for projecting at least one image of claim 25, further comprising:
an optical element state sensor determining the state of the optical element.

37. The method for projecting at least one image of claim 25, further comprising:
a body configuration sensor determining at least one selected from the group consisting of an amount of telescoping portion extension, an internal optical path length, a mounting apparatus state, and a body orientation.

38. The method for projecting at least one image of claim 25, further comprising:
a controller driving the projection display engine; and
an ambient environment sensor coupled to the controller and conveying information about the ambient environment to the controller; and wherein the controller selecting at least one display parameter responsive to the information about the ambient environment.

39. The method for projecting at least one image of claim 25, wherein the first image is the same as the second image.

40. The method for projecting at least one image of claim 25, wherein the first image is different than the second image.

41. The method for projecting at least one image of claim 25, wherein the second image includes a control field, and wherein the handheld portable projector system optically receiving input from the control field.

42. The method for projecting at least one image of claim 41, wherein receiving input by the handheld portable projector comprises selecting an image attribute.

43. The method for projecting at least one image of claim 41, wherein receiving input by the handheld portable projector via the second image comprises modifying the first image.

* * * * *